(12) United States Patent
Salerno

(10) Patent No.: US 12,466,421 B2
(45) Date of Patent: Nov. 11, 2025

(54) SYSTEMS AND METHODS FOR GEAR GUARD CABLE TRACKING

(71) Applicant: RIVIAN IP HOLDINGS, LLC, Plymouth, MI (US)

(72) Inventor: Jonathan David Salerno, Newport, CA (US)

(73) Assignee: RIVIAN IP HOLDINGS, LLC, Plymouth, MI (US)

( * ) Notice: Subject to any disclaimer, the term of this patent is extended or adjusted under 35 U.S.C. 154(b) by 395 days.

(21) Appl. No.: 17/877,337

(22) Filed: Jul. 29, 2022

(65) Prior Publication Data

US 2023/0078631 A1 Mar. 16, 2023

Related U.S. Application Data

(60) Provisional application No. 63/243,162, filed on Sep. 12, 2021.

(51) Int. Cl.
| | |
|---|---|
| *B60W 50/14* | (2020.01) |
| *B60W 30/14* | (2006.01) |
| *G06T 7/20* | (2017.01) |
| *G06T 7/70* | (2017.01) |
| *G06V 20/56* | (2022.01) |

(52) U.S. Cl.
CPC .......... *B60W 50/14* (2013.01); *B60W 30/143* (2013.01); *G06T 7/20* (2013.01); *G06V 20/56* (2022.01); *B60W 2420/403* (2013.01); *G06T 7/70* (2017.01); *G06T 2207/30252* (2013.01)

(58) Field of Classification Search
CPC ......... F41H 11/02; B64U 10/13; B64U 50/34; B64U 2101/15; B64U 2101/31; B64U 2201/104; B64U 2201/202; B64U 80/86; G05D 1/0094; G05D 1/101; G06N 20/00; B60W 50/14; B60W 40/13; B60W 60/001; B60W 2050/146; B60W 2420/403; B60W 2556/40; G06T 7/70; G06T 2207/30252;

(Continued)

(56) References Cited

U.S. PATENT DOCUMENTS

| | | | |
|---|---|---|---|
| 5,434,552 A | * | 7/1995 | Ems .................. B60D 1/58 340/687 |
| 6,698,903 B2 | | 3/2004 | Hall |

(Continued)

OTHER PUBLICATIONS

Ivanova, I., Andrić, M., Moaveninejad, S., Janes, A., & Ricci, F. (2020). Video and Sensor-Based Rope Pulling Detection in Sport Climbing. Proceedings of the 3rd International Workshop on Multimedia Content Analysis in Sports, 53-60. https://doi.org/10.1145/3422844.3423058 (Year: 2020).*

*Primary Examiner* — Kito R Robinson
*Assistant Examiner* — Rose Ridder
(74) *Attorney, Agent, or Firm* — Haley Guiliano LLP

(57) ABSTRACT

Systems and methods are provided to detect a motion event corresponding to at least one of a vehicle tow assembly, a winch assembly, or a gear guard cable. With the use of one or more cameras, the system captures images of a cable (e.g., a gear guard cable, a winch cable, or a tow cable). With the use of processing circuitry, a cable is identified in the captured images. The movement of the cable is tracked in the captured images. A motion event of the cable is identified based on the movement. In response to detecting the motion event, a vehicle comprised of the system and the cable performs an action.

20 Claims, 10 Drawing Sheets

(58) Field of Classification Search
CPC .......... G06T 2207/30268; G06V 20/56; G06V 20/59
See application file for complete search history.

(56) References Cited

U.S. PATENT DOCUMENTS

| | | | | |
|---|---|---|---|---|
| 10,491,816 | B2 | 11/2019 | Unger | |
| 10,558,864 | B2 | 2/2020 | Huang et al. | |
| 10,967,719 | B1* | 4/2021 | Mellick | B60J 11/04 |
| 11,287,284 | B1 | 3/2022 | Ferguson et al. | |
| 2010/0213313 | A1* | 8/2010 | Reed | G06Q 10/08 |
| | | | | 244/118.1 |
| 2016/0272277 | A1* | 9/2016 | Hayslett | B60W 10/08 |
| 2017/0351268 | A1* | 12/2017 | Anderson | G07C 5/0825 |
| 2020/0047669 | A1* | 2/2020 | Fendt | B60W 40/105 |
| 2020/0186699 | A1 | 6/2020 | Hlatky et al. | |
| 2021/0061159 | A1* | 3/2021 | Gadde | B60P 7/06 |
| 2022/0009632 | A1* | 1/2022 | Gallo | B64D 3/00 |
| 2022/0207278 | A1* | 6/2022 | Nagata | H04N 5/76 |
| 2022/0227356 | A1* | 7/2022 | Gould | H04W 4/029 |
| 2022/0242302 | A1* | 8/2022 | Goetz | B60P 7/0869 |
| 2024/0124007 | A1* | 4/2024 | Hawley | G06T 7/70 |

* cited by examiner

SYSTEMS AND METHODS FOR GEAR GUARD CABLE TRACKING

CROSS-REFERENCE TO RELATED APPLICATIONS

This application claims the benefit of U.S. Provisional Patent Application No. 63/243,162 filed Sep. 12, 2021, the disclosure of which is hereby incorporated by reference herein in its entirety.

INTRODUCTION

The present disclosure is directed to stored and connected items and, more particularly, to ensuring that items stored and connected to a vehicle are safe and secure.

SUMMARY

Systems and methods are disclosed herein for monitoring a cargo bay of a vehicle (e.g., a truck bed). In some embodiments, data corresponding to a gear guard cable is analyzed while, for example, the vehicle is in operation (e.g., the vehicle is being driven by a driver or an autonomous control system) or at rest (e.g., when one or more vehicle systems are active and configured for a monitoring mode). For example, a system monitors the position of the gear guard cable relative to the cargo bay to determine if the cable is damaged, loose, moving or otherwise unfit and/or incapable of adequately securing cargo in the cargo bay, or otherwise being interfered with.

In some embodiments, the system includes one or more cameras configured to capture images of a vehicle cargo bay and a cable. In some embodiments, a camera is configured to capture images of outside of a vehicle. Additionally processing circuitry is configured to identify a motion event of a cable (e.g., one of a gear guard cable, a winch cable, or a tow cable) in the captured images. In some embodiments, the cable comprises a reflective coating or reflective elements. In response to detecting a motion event, the vehicle may perform an action (e.g., close a cargo bay cover). The system further includes processing circuitry configured to detect the position and motion of the gear guard cable (e.g., relative to a secured or locked position). Based on detecting a current range of motion and comparing the current range of motion to at least one of a stable range of motion and an unstable range of motion of the cable, the system can report out to the user a need to take action relative to the cable should the cable move from the stable range of motion to the unstable range of motion.

In some embodiments, the system is configured to store at least one of images or video from at least one of the plurality of cameras to establish a first motion-based event, which may correspond to a secured or otherwise stable cable. The system further detects a second motion-based event. For example, when one end of the cable comes loose from an anchoring point corresponding to the vehicle bay, the motion of the cable has a different image/video profile than when the cable is secured to the anchoring point. Based on detecting the second motion-based event, the system then performs a comparison between at least one of the first motion event, the stable range of motion, or the unstable range of motion. Based on the comparison, a cable status is determined and reported to a vehicle user (e.g., a heads up display or center console display may report a "secured" or "loose" status depending on the result of the comparison, where the "loose" status may be paired with details such as "cable not secured to one of two bay anchors").

In some embodiments, the processing circuitry is further configured to identify the cable in the captured images (e.g., based on the reflective properties of the cable), track movement of the cable between the captured images (e.g., comparative mapping), and identify the motion event based on the movement (e.g., the cable is loose or broken on one or both ends).

In some embodiments, the system detects a third motion-based event associated with the guard cable. In some embodiments, one camera of the plurality of cameras is positioned at the upper rear of an occupant compartment and has a view of the exterior storage area of the vehicle. For example, the exterior storage area of the vehicle may include a truck bed. Based on detecting the third motion-based event, the system performs a second comparison of at least one of the cable position or motion to at least one of the first motion event, the second motion event, the stable range of motion, or the unstable range of motion. The second comparison may yield a response action such as, for example, closing a motorized cable assembly. Other examples of a response action include generating one or more audible or video alerts either similar to, the same as, or different from the cable status generated in response to detecting at least one of the first or second motion event (e.g., the cable was secured during the first event, became loose during the second event, and then was resecured during the third event).

In some embodiments, the system detects a collision event. For example, the system may detect the collision event based on one or more audible sensors configured to monitor elevated sounds or accelerometer sensors configured to monitor speed changes. Based on detecting a collision event, the system may prompt the user to take action relative to the cable. In some embodiments, the processing circuitry identifies a location of damage associated with the collision event on the vehicle based on at least one image from the captured images. The processing circuitry provides the at least one image from the captured images associated with the location of damage to the user in order to clarify any change in status relative to the guard cable.

In some embodiments, the systems and methods include a vehicle sensor configured to detect a motion-based event associated with a guard cable corresponding to a vehicle bay. The vehicle sensor may be configured to capture an image or a video of at least one of a portion of the cable or a portion of the vehicle bay or the entirety of either or both of the cable or the vehicle bay. The system automatically captures via the vehicle sensors at least one image of the motion-based event (e.g., captures an image of the cable as it moves relative to at least one of a starting or secured position at the time a new vehicle trip starts). The processing circuitry further presents on a user interface enabling the user to receive and view status icons corresponding to at least one of the cable or the vehicle bay (e.g., "Bay: Empty," "Bay: Loaded," "Cable: Secured," "Cable: Loose," "Cable: Broken," or "Theft Alert").

In some embodiments, the system determines that an enhanced monitor mode is enabled for the vehicle. Based on the monitor mode being enabled, the system permits one or more vehicle sensors to capture motion-based events. In some embodiments, the monitor mode is triggered automatically when the vehicle is locked. In other embodiments, the monitor mode is enabled in response to the vehicle being away from a trusted location. In some embodiments, the monitor mode corresponds to an instruction to close a vehicle bay cover in response to a determination corresponding to at least one of a loose or broken guard cable (e.g., an automated truck bed cover is extended over a truck bed corresponding to the vehicle bay and locked into a closed position).

In some embodiments, the motion-based event associated with the vehicle is based on at least one or more of a vehicle collision data, a vehicle pressure data, or an airbag deployment data. In response to receiving the vehicle collision data, at least one of a guard cable status or vehicle bay status is generated for display and may include an audible indication of at least one of the guard cable status or the vehicle bay status.

In some embodiments, the vehicle sensor is connected to an on-board computer configured to operate the vehicle. In some implementations, the on-board computer is configured to operate the vehicle as an autonomous vehicle. In some embodiments, the on-board computer is communicatively connected to one or more of a mobile device via a wireless connection or a cloud-based server. In some embodiments, the system in response to a request, or automatically, transmits the stored images and videos of motion-based events to the cloud via a server. In some embodiments, the vehicle may process the video to reduce the size of the video by performing an analysis on the video and cutting out extraneous content. In some embodiments, the vehicle may transmit a lower quality version to the server and may request confirmation for transfer of the higher quality version.

In some embodiments, the processing circuitry determines a collision event. The processing circuitry may determine the collision event in response capturing at least one image of the motion-based event. The processing circuitry may identify a location of damage associated with the collision event on the vehicle based on the at least one image. The processing circuitry may also provide at least one of an audio or video indication of at least one of a guard cable status or a vehicle bay status.

In some embodiments, the processing circuitry determines a level of damage to the vehicle based on at least one image of the motion-based event stored at a first storage location. When the level of damage to the vehicle exceeds a threshold, the processing circuitry causes the at least one image of the motion-based event to be stored at a second storage location remote from the first storage location.

In some embodiments, the processing circuitry presents an alert of the motion-based event on the user interface. The processing circuitry may receive a selection to view the at least one image of the motion-based event. The processing circuitry generates for presentation on the user interface the at least one image (e.g., an image or video corresponding to at least a portion of the guard cable or at least a portion of the vehicle bay in order to adequately characterize whether one or both of the guard cable and vehicle bay are either unsecured or damaged).

In some embodiments, the processing circuitry categorizes the at least one image into an event-based category based on an event type of the motion-based event (e.g., storing images based on at least one category such as "vehicle bay damaged" or "guard cable damaged").

In some embodiments, the vehicle may comprise an integrated package of a reflective guard (with reflective elements designed to maximize detection and suppress false alarm), the camera system, and a monitoring system configured to execute the various methods descried herein.

In some embodiments, the vehicle may comprise a plurality of cameras configured to capture images of at least a portion of at least one of a vehicle bay, a guard cable, a tow assembly, or a winch assembly at both or either of a front portion of the vehicle or a rear portion of the vehicle. Based on a detection of a motion event (e.g., by processing the camera data with or without vehicle sensor data) corresponding to at least one of the listed components, the tension on tow/winch cables may be sensed corresponding to something being pulled towards the front portion or rear portion of the vehicle. In response to sensing the tension, the torque or speed of either the winch assembly or tow assembly may be adjusted based on the sensed slack to stabilize the cables comprising either the winch assembly or tow assembly.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Methods and systems are provided herein for monitoring the cargo bay of a vehicle (e.g., a truck bed) by analyzing data corresponding to a gear guard cable while, for example, the vehicle is in operation (e.g., the vehicle is being driven by a driver or an autonomous control system) or at rest (e.g., when one or more vehicle systems are active and configured for a monitoring mode).

Figure 1:
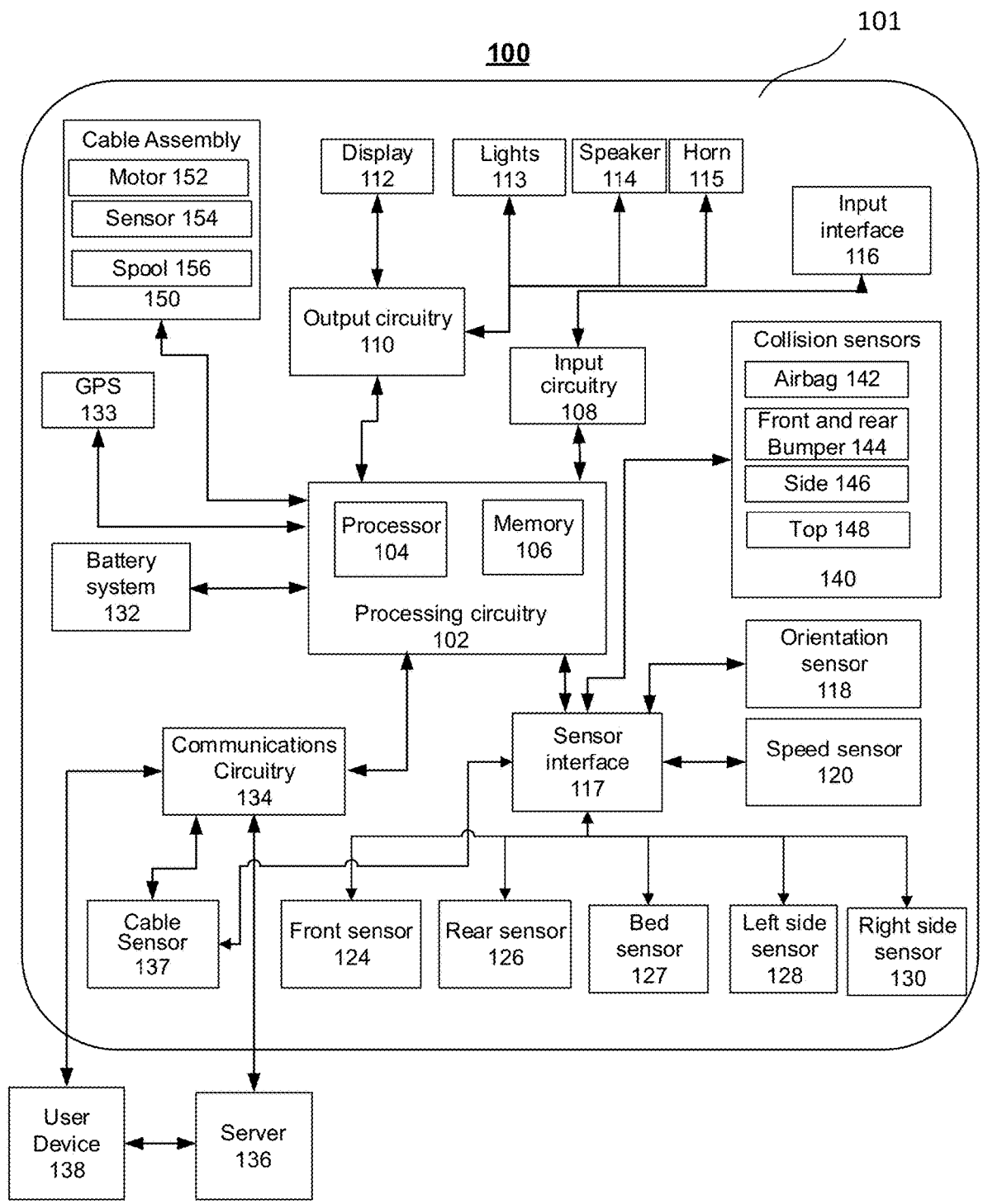
FIG. 1 shows a block diagram of components of a system of a vehicle configured to monitor the surrounding area of the vehicle, the vehicle bay, and a cable guard corresponding to the vehicle bay, in accordance with some embodiments of the present disclosure.

FIG. 1 shows a block diagram of components of a system 100 of a vehicle 101 configured to monitor the surrounding area of the vehicle, in accordance with some embodiments of the present disclosure. System 100 may comprise more or fewer than the elements depicted in or described in reference to FIG. 1. Additionally, system 100 may incorporate or may be incorporated into any or all of FIGS. 2-10. In some embodiments, vehicle 101 is configured to capture at least one of images or video for determining a gear guard cable status. Vehicle 101 may be a car (e.g., a coupe, a sedan, a truck, an SUV, a sport utility vehicle, a full-size van, a minivan, a delivery van, a bus), a motorcycle, an aircraft (e.g., a drone), a watercraft (e.g., a boat), or any other type of vehicle. Vehicle 101 may include any kind of motor or motors capable of generating power (e.g., gas motors, gas-electric hybrids motors, electric motors, battery-powered electric motors, hydrogen fuel cell motors).

Vehicle 101 may comprise processing circuitry 102 which may include processor 104 and memory 106. Processor 104 may comprise a hardware processor, a software processor (e.g., a processor emulated using a virtual machine), or any combination thereof. In some embodiments, the processing circuitry is part of an on-board computer, that is configured to operate the vehicle. In some embodiments, the on-board computer may be configured to operate the vehicle autonomously or semi-autonomously. The on-board computer may include communications drivers that communicate with a user device 138 and servers 136. In some embodiments, processor 104 and memory 106 in combination may be referred to as processing circuitry 102 of vehicle 101. In some embodiments, processor 104 alone may be referred to as processing circuitry 102 of vehicle 101. Memory 106 may include hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection. For example, the one or more captured images or videos related to motion events may be automatically uploaded to the server 136 (e.g., in compressed or full format) and a user device 138 can access and view the one or more captured images or videos. Alternatively, the one or more captured images or videos can be accessed remotely from the vehicle 101 (e.g., when the vehicle is connected to the Internet or only when connected via WiFi or plugged into a charger).

Processing circuitry 102 may be communicatively connected to input interface 116 (e.g., a steering wheel, a touch screen display, buttons, knobs, a microphone or other audio capture device) via input circuitry 108. In some embodiments, at least one of a driver or occupant of vehicle 101 may be permitted to select certain settings in connection with the operation of vehicle 101. In some embodiments, processing circuitry 102 may be communicatively connected to GPS system 133 or other positioning devices of vehicle 101, where the driver may interact with the GPS system via input interface 116. GPS system 133 may be in communication with at least one satellite (or satellites) or server (or servers) 136 remote from vehicle 101 to ascertain the driver's location and provide navigation directions to processing circuitry 102. As another example, the positioning device may operate on terrestrial signals, such as cell phone signals, Wi-Fi signals, or ultra-wideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106).

Processing circuitry 102 may be communicatively connected to display 112, lights 113, speaker 114 and horn 115 by way of output circuitry 110. Display 112 may be located on or within at least one of a dashboard of vehicle 101 or a heads-up display at a windshield of vehicle 101. For example, an interface for GPS system 133 or an interface of an infotainment system may be generated for display, and display 112 may comprise an LCD display, an OLED display, an LED display, or any other type of display. Lights 113 may be located at one or more of any location within the cabin of vehicle 101 (e.g., at the dashboard of vehicle 101), on the exterior of the vehicle, on an interior portion of the vehicle door, on exterior flasher lights, on exterior headlights, or on exterior blinker lights. In some embodiments, the lights may be LED lights and may increase luminance based on the detection of a motion event.

Processing circuitry 102 may be communicatively connected (e.g., by way of sensor interface 117) to sensors (e.g., front sensor 124, rear sensor 126, truck bed sensor 127, left side sensor 128, right side sensor 130, cable sensor 137, orientation sensor 118, speed sensor 120). Orientation sensor 118 may be an inclinometer, an accelerometer, a tiltmeter, any other pitch sensor, or any combination thereof and may be configured to provide vehicle orientation values (e.g., the vehicle's pitch or the vehicle's roll) to processing circuitry 102. Speed sensor 120 may be one of a speedometer, a GPS sensor, or the like, or any combination thereof, and may be configured to provide a reading of the vehicle's current speed to processing circuitry 102. At least one of front sensor 124, rear sensor 126, truck bed sensor 127, left side sensor 128, right side sensor 130, or cable sensor 137 may be positioned at a variety of locations of vehicle 101, and may comprise one or more of a variety of sensor types (e.g., one or more of an image sensor, an ultrasonic sensor, a radar sensor, LED sensor, LIDAR sensor configured to output a light or radio wave signal, and measuring at least one of a time for a return signal to be detected or an intensity of the returned signal, performing image processing on images captured by the image sensor of the surrounding environment of vehicle 101). In some embodiments, processing circuitry 102 may take into account the acceleration/deceleration of vehicle 101, e.g., based on sensor data generated by orientation sensor 118 which may trigger a motion event exceeding an event detection threshold.

Processing circuitry 102 may further be communicatively connected (e.g., by way of sensor interface 117) to collision sensors 140 (e.g., airbag sensor 142, bumper 144, side 146, top 148). The collision sensors 140 may include an airbag system, e.g., window area sensors, airbag system, and collision sensor. The airbag system includes multiple airbag sensors 142 arranged proximate to one or more window areas or other areas of the vehicle and configured to transmit a signal to processing circuitry in response to the deployment of an airbag. Vehicle collision sensor(s) 140 typically include gyroscopes, accelerometers, or both. For example, vehicle collision sensor(s) 140 may include a MEMS accelerometer capable of detecting the deceleration of a vehicle during an impact and position of the vehicle. Vehicle collision sensor(s) 140 may be arranged at various positions in a vehicle. For example, vehicle collision sensor(s) 140 may be configured to detect impacts, motion and deceleration at the front of vehicle 101, side of vehicle 146, rear of vehicle 144, top of vehicle 148, or a combination thereof (e.g., at the corners of vehicle 101). In some embodiments, vehicle collision sensor(s) 140 includes more than one sensor, each having similar circuitry and capabilities for detecting collision scenarios for vehicle 101. In some embodiments, vehicle collision sensor(s) 140 includes more than one sensor, each having different capabilities that are, for example, designed for the particular location of the vehicle. In some embodiments, the sensors are configured to capture video. In some embodiments, the level of damage may be determined based on the damage occurring at a particular location on the vehicle. For example, the vehicle may be involved in a small bumper-to-bumper accident, and the location sensors for the bumper may indicate the level of damage as low based on a signal from a sensor. In some embodiments, vehicle collision sensor(s) 140 includes a seat sensor configured to detect whether a person is sitting in a particular seat.

Vehicle collision sensor(s) 140 may be in communication with processing circuitry 102. In some embodiments, processing circuitry 102 is configured to analyze data from vehicle collision sensor(s) 140 and send one or more signals to activate one or more airbags 142 of airbag system. Based on information from vehicle collision sensor(s) 140, processing circuitry 102 may determine an impact type (e.g., a side, a front, a rear, a corner or a rollover collision or a flooding event) and vehicle occupancy (e.g., driver, and passengers, if any) and initiate deployment of a suitable airbag of airbag system for the impact type. Based on information from vehicle collision sensor(s) 140, processing circuitry 102 may determine which camera captured at least one of the images or video of at least one of the impact, the vehicle bed event, or guard cable event to streamline the processing. The image, images, or video captured may correspond to at least one of gear guard cable, an area inclusive of the gear guard cable, or cargo secured based on an arrangement of the gear guard cable. In response to the collision, gear guard cable and cargo related issues are analyzed for reporting a status related to either or both of the gear guard cable and the cargo.

In response to the level of damage exceeding a damage threshold (e.g., multiple airbags were deployed, bumper pressure exceed a limit as determined by a sensor), the system may process at least one of images, video, or other sensor data corresponding to a vehicle bay status and a cable status. For example, the vehicle bay status may be at least one of "Bay: Open," "Bay: Closed," "Bay: Damaged," "Bay: Empty," and "Bay: Loaded". In another example, the cable status may be at least one of "Cable: Secured," "Cable: Loose," "Cable: Cut," and "Cable: Anchor Damaged." In some embodiments, a status may be reported with respect to cargo, such as "Cargo: Displaced," "Cargo: Damaged," or "Cargo: Missing". In some embodiments, the severity of an accident can trigger at least one of additional or other activities (e.g., emergency response, accident cleanup, towing, alternative transportation).

In some embodiments, the processing circuitry 102 determines the collision event by accelerometers sensors configured to monitor changes in speed. For example, if the speed of the vehicle changes, the processing circuitry 102 may perform a vehicle collision sensor check to ensure that all sensors on the exterior of the vehicle are responsive. In response to the sensors not responding, the processing circuitry 102 may determine that a collision occurred and being the process of reporting a status.

Processing circuitry 102 may further be communicatively connected to cable assembly 150 or another means for securing cargo in or to an exterior storage compartment. Cable assembly 150 may include a motor 152, one or more sensors 154, and spool 156. Motor 152 may include, for example, a DC motor (e.g., permanent magnet motor, brushed or brushless motor, wound stator), an AC motor (e.g., an induction motor), any other suitable motor having any suitable number of poles and phases, or any combination thereof. For example, motor 152 may include a permanent magnet DC motor configured to operate at 12 VDC. A clutch may be configured to couple and de-couple motor 152 from spool 156. For example, in some embodiments, the clutch is controlled by processing circuitry 102, which may provide control signals for engaging or disengaging the clutch. In an illustrative example, the clutch may be disengaged to allow free-spooling of the cable assembly. Spool 156 is coupled to motor 152, optionally via a gearset to provide gear reduction, and rotates with a motor shaft of motor 152. The cable is wound on spool 156 and is used to pull or tow cable assembly from an open position to a closed position. Sensor(s) 154 may include voltage sensors, current sensors, temperature sensors, impedance sensors, position sensors (e.g., encoders for determining spool position), torque sensors, any other suitable sensors, or any combination thereof. Cable assembly 150 may be integrated into at least one of the body or the frame of the vehicle storage compartment or may be affixed to the vehicle separately, although the electric power and controls for cable assembly 150 are coupled to the vehicle 101. In some embodiments, cable assembly 150 may include power electronics (e.g., a motor drive), and accordingly may be coupled to battery system 132 and be configured to receive control signals from processing circuitry (e.g., analog signals, PWM signals, digital signals, messages).

Processing circuitry 102 may be communicatively connected to battery system 132, which may be configured to provide power to one or more of the components of vehicle 101 during operation. In some embodiments, vehicle 101 may be an electric vehicle or a hybrid electric vehicle. In some embodiments, the processing circuitry 102 may monitor the environment surrounding the vehicle by utilizing a plurality of battery cells packaged together to create one or more battery modules or assemblies to store energy and release the energy upon request.

It should be appreciated that FIG. 1 only shows some of the components of vehicle 101, and it will be understood that vehicle 101 also includes other elements commonly found in any assembly corresponding to a vehicle, such as a vehicle powered by substantially electronic powertrain (e.g., a motor, brakes, wheels, wheel controls, turn signals, windows, or doors).

Figure 2:
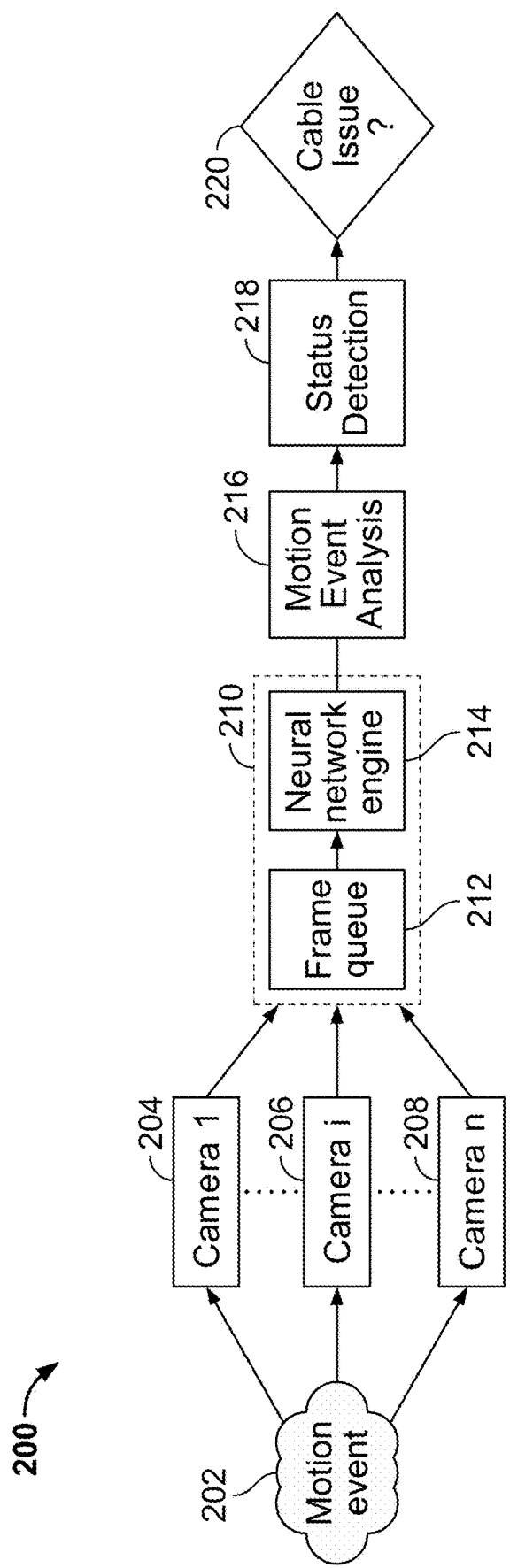
FIG. 2 shows a block diagram of a system of a vehicle configured to monitor the surrounding area of the vehicle, the vehicle bay, and a cable guard corresponding to the vehicle bay, in accordance with some embodiments of the present disclosure.

FIG. 2 shows a block diagram of a system 200 of a vehicle 200 configured to monitor a vehicle bay and a guard cable or other surrounding objects, in accordance with some embodiments of the present disclosure. System 200 may comprise more or fewer than the elements depicted in or described in reference to FIG. 2. Additionally, system may incorporate or may be incorporated into any or all of FIGS. 1 and 3-10. System 200 may comprise multiple cameras 204, 206, 208, and motion event detection network 210, and status detection module 218. In some embodiments, one or more components (e.g., motion event detection network 210 and status detection module 218) of system 200 may be implemented by at least one of processing circuitry 102 or processing circuitry of server 136). One or more of cameras 204, 206, 208 may each correspond to one of sensors 124, 126, 127, 128, 130, and 137.

Cameras 204, 206, 208 may be mounted on any suitable internal or external portion of vehicle 101. In some embodiments, one or more of cameras 204, 206, 208 may correspond to monocular fisheye cameras configured to cover a wide field of view around vehicle 101. While FIG. 2 depicts three cameras, it should be appreciated that any suitable number of cameras may be employed (e.g., less than three cameras or more than three cameras, such as, for example, four cameras respectively positioned at a front, rear and each side of vehicle 101). In some embodiments, five cameras may be respectively positioned at a front, rear and each side of vehicle 101 and facing a truck bed). Such cameras may be mounted at any suitable respective positions of vehicle 101 in order to facilitate the capturing images of the entire region or environment of motion event 202 around vehicle 101, while vehicle 101 is stationary or in motion. Motion event 202 may correspond to at least one of the vehicle bay being opened, loaded, or closed as well as at least one of a guard cable being secured, unsecured, broken, moved, loosened, or damaged (e.g., as reported at least in part by a cable sensor which may correspond to a cable anchor). Motion event 202 may be characterized based on captured images of at least one of the cable, cargo secured by the cable, or a vehicle bay. A series of images may be captured by cameras 204, 206, 208, including any suitable number of images, which provide images of the cable inclusive of a reflective material on the cable for storage, comparison, analysis, and status reporting. In some embodiments, images may be captured repeatedly (e.g., at a predetermined frequency, to capture the surrounding environment of vehicle 101 over time).

One or more images or frames captured by cameras 204, 206, 208 may be input to motion event detection network 210, e.g., comprising frame queue 212 and neural network 214. Motion event detection network 210 may be configured to identify one or more candidate objects (e.g., a surface of the cable, an end of the cable, or other features of the cable comprised of reflective material) in the images captured by cameras 204, 206, 208 using any suitable image recognition technique. In some embodiments, processing circuitry 102 may manipulate any of the series of captured images such that a candidate object is located at a similar position across all camera images. Motion event detection network 210 may be configured to output one or more 2D motion event analysis 216 for the one or more candidate objects. For example, motion event detection network 210 may be configured to draw 2D bounding shapes (e.g., bounding boxes, bounding polygons, bounding triangles, bounding ellipses, or bounding circles) around candidate objects (e.g., vehicles, humans, animals, gear guard cables, or other obstacles) positioned in front of, behind, or to a side of vehicle 101. Frame queue 212 may store the plurality of images captured by cameras 204, 206, 208 of the surrounding environment of vehicle 101, and such images may be input to neural network 214 in, e.g., a first-in first-out manner. Neural network 214 may be, e.g., a convolutional neural network (CNN), or any other suitable machine learning model trained to accept as input an image of a surrounding environment of vehicle 101 and output respective motion event analysis 216 for the one or more candidate objects. Object proximity to vehicle 101 may be estimated based on the object detection representation. In some embodiments, when one or more of cameras 204, 206, 208 correspond to a fisheye camera, which produces a relatively large distortion based on its wide-angle lens, neural network 214 may be trained using images having a distortion similar to the distortion produced by fisheye camera lens.

In some embodiments, neural network 214 may be trained to learn patterns and features associated with certain classes of objects (e.g., a person, a car, a bus, a motorcycle, a train, a bicycle, a gear guard cable, or a background). In some embodiments, such machine learning models may be trained to learn patterns and features associated with sub-classes (e.g., a sedan, a minivan, a truck) of a class (e.g., cars). Classification may be carried out by neural network 214 comprising one or more machine learning models, such as a CNN trained to receive input images of objects surrounding a vehicle (e.g., where the image may be annotated with any suitable bounding shape relative to at least one of an object, a distance from vehicle to object annotation, or a class of object annotation), and output likelihoods that these vehicles correspond to particular vehicle categories. Such CNNs may be trained on training data sets containing images of vehicles manually tagged with their particular vehicle types. In some embodiments, any combination of the following classes may be employed via at least one of training or evaluating the model (e.g., background, airplane, bicycle, bird, boat, bottle, bus, car, cat, chair, cow, dining table, dog, horse, motorbike, motorcycle, person, potted plant, sheep, sofa, train, TV monitor, truck, stop sign, traffic light, traffic sign, motor). In some embodiments, a confidence score may be output along with the prediction of a class to which an identified object belongs (e.g., an 86% confidence an object is a human being).

In some embodiments, any suitable batch size may be used in training the model (e.g., 32, 64, or any suitable batch size for training the model) and a neg_pos_ratio for hard negative mining may be any suitable value (e.g., 3, 5, or any suitable numeric value). In some embodiments, any suitable weights may be applied to the classes of objects (e.g., to account for entropy loss). For example, the classes of bicycle, bus, car, motorcycle, person, and train, may be assigned respective weights of 1.25, 0.9, 0.9, 0.9, 0.9. 1.25, 0.9. In some embodiments, a prior box from baseline may be updated considering the characteristics of a bounding shape of a particular object (e.g., person).

Status detection module 218 may be configured to output a determination 220 of a cable issue (associated with motion event analysis 216) corresponding to at least one of a vehicle bay (e.g., a truck bed) or a gear guard cable comprising vehicle 101. The status detection module 218 may include outlier rejection model and object-to-vehicle distance estimation model. In some embodiments, one or more components (e.g., outlier rejection model and object-to-vehicle distance estimation model) of status detection module 218 may be implemented by at least one of processing circuitry 102 or processing circuitry of server 136.

Status detection module 218 may receive one or more motion event analysis 216 from motion event detection network 210, and perform preprocessing at 102, e.g., to extract suitable features from at least one of motion event analysis 216, convert motion event analysis 216 into a vector or matrix representation, or match formatting of motion event analysis 216 to formatting of template data, normalization, resizing, or minimization. In some embodiments, the processing circuitry may perform one or more of the following image processing techniques: brightening the image or portions thereof, darkening the image or portions thereof, color-shifting the image (e.g., among color schemes, from color to grayscale, or other mapping), cropping the image, scaling the image, adjusting an aspect ratio of the image, adjusting the contrast of an image, performing any other suitable processing to prepare the image, or any combination thereof. Any suitable number of features of the candidate object may be input to status detection module 218 (e.g., an x coordinate, a y coordinate, a height, or a width associated with an object).

The determination 220 of a cable issue (associated with motion event analysis 216) corresponding to components of vehicle 101 may determine whether there is movement or damage to at least one of a vehicle bay/bed or a gear guard cable. For example, the gear guard cable may be broken or interfered with and determination 220 yields the generation of an instruction to close at least one of a vehicle bay door or a vehicle bay cover.

In some embodiments, motion event analysis 216 operates on the captured images using comparative mapping. For example, the cable can be identified in the images based on its reflectivity and differences in the cable position between images can be used to determine movement of the cable. Status detection 218 may be configured to determine an amount of movement (e.g., rate of change or absolute movement) of the cable and determine whether it is within an acceptable range. If the amount of movement is greater than a threshold, then a motion event is determined. While the vehicle is moving, a motion event may indicate that the gear guard cable is loose or not secure. While the vehicle is at rest, a motion event may indicate that the cable or cargo associated with the cable is being interfered with.

Figure 3:
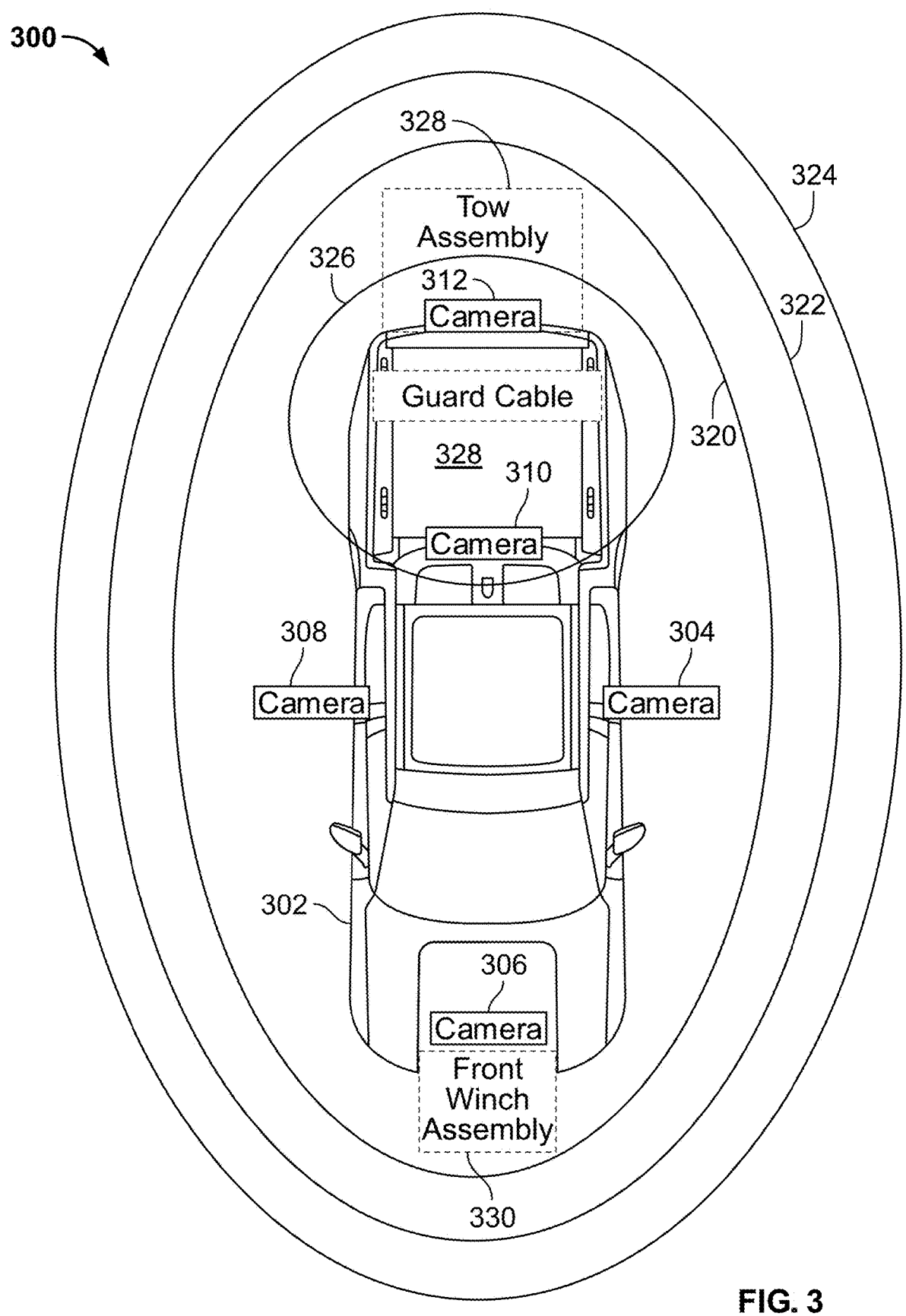
FIG. 3 shows a top view of an illustrative vehicle configured with system configured to monitor the vehicle bay and a cable corresponding to the vehicle bay, in accordance with some embodiments of the present disclosure.

FIG. 3 shows a top view 300 of an illustrative vehicle 302 configured with a monitored area for detecting an issue corresponding to at least one of a vehicle bay or the gear guard cable corresponding to the vehicle bay, in accordance with some embodiments of the present disclosure. Top view 300 may comprise more or fewer than the elements depicted in or described in reference to FIG. 3. Additionally, top view 300 may incorporate or may be incorporated into any or all of FIGS. 1, 2, and 4-10.

Top view 300 includes a depiction of vehicle 302 along with the position of the cameras disposed around the vehicle. Vehicle 302 may include multiple cameras 304, 306, 308, 310 and 312, and a plurality of event detection thresholds 320, 322, 324 and 326 (e.g., values corresponding to sensor, video, or image analysis to determine a motion event corresponding to at least one of vehicle bay 328 and the guard cable installed in vehicle bay 328), and a proximity sensing module, not shown. In some embodiments, one or more components (e.g., motion event detection network 210 and status detection module 218) of system 200 may be implemented by processing circuitry 102 (or processing circuitry of server 136). One or more of cameras 304, 306, 308, 310 and 312 may each correspond to one of sensors 124, 126, 127, 128, 130, and 137. Camera 304 is positioned on a first side of the vehicle, camera 306 is positioned on a front side of the vehicle, camera 308 is positioned on a second side of the vehicle, camera 312 is positioned on a rear side of the vehicle and camera 310 is positioned at the upper rear of an occupant compartment and has a view of the exterior storage area of the vehicle. In some embodiments, any suitable number of cameras may be used, and diverse positions of the cameras (e.g., showing a variety of different angles at varying distances from each other in various different environments) may be used.

The use of cameras 304, 306, 308, 310 and 312 can be used to form the event detection thresholds 320, 322, 324 and 326. For example, by having the cameras capture images surrounding the vehicle, objects that exhibit motion-based characteristics that exceed a motion event threshold may trigger an event detection action. For example, a first event detection threshold 324 of the plurality of event detection thresholds 320, 322, 324, 326 may span any suitable distance from the vehicle and each subsequent event detection threshold may be closer to the vehicle 302. For example, the first event detection threshold 324 may incorporate at least one of sensor, video, or camera data corresponding to motion events occurring within a first proximity of the entire vehicle surroundings, while the second event detection threshold 322 may incorporate at least one of sensor, video, or camera data corresponding to motion events occurring within a second proximity of the entire vehicle surroundings. Third event detection threshold 320 may incorporate at least one of sensor, video, or camera data corresponding to motion events occurring within a third proximity of the entire vehicle surroundings, while fourth event detection threshold 326 may incorporate at least one of or only one of sensor, video, or camera data corresponding to motion events occurring within vehicle bay 328, which is illustrated with a guard cable affixed to the two side walls comprising vehicle bay. The proposed event detection thresholds are illustrative and should not be limited in number and distance from the vehicle. In some embodiments, any two event detection thresholds may be employed as part of the event detection system. In some embodiments, the captured images may comprise a fisheye image of any suitable size (e.g., 1376×976 fisheye image).

In some embodiments, vehicle 302 comprises at least one of tow assembly 328 or winch assembly 330. For example, either or each of tow assembly 328 and winch assembly 330 comprise components which can be monitored like the guard cable (e.g., reflective materials which can be analyzed for position and motion characteristics through sensor data, video data, and or image data analysis).

Figure 4:
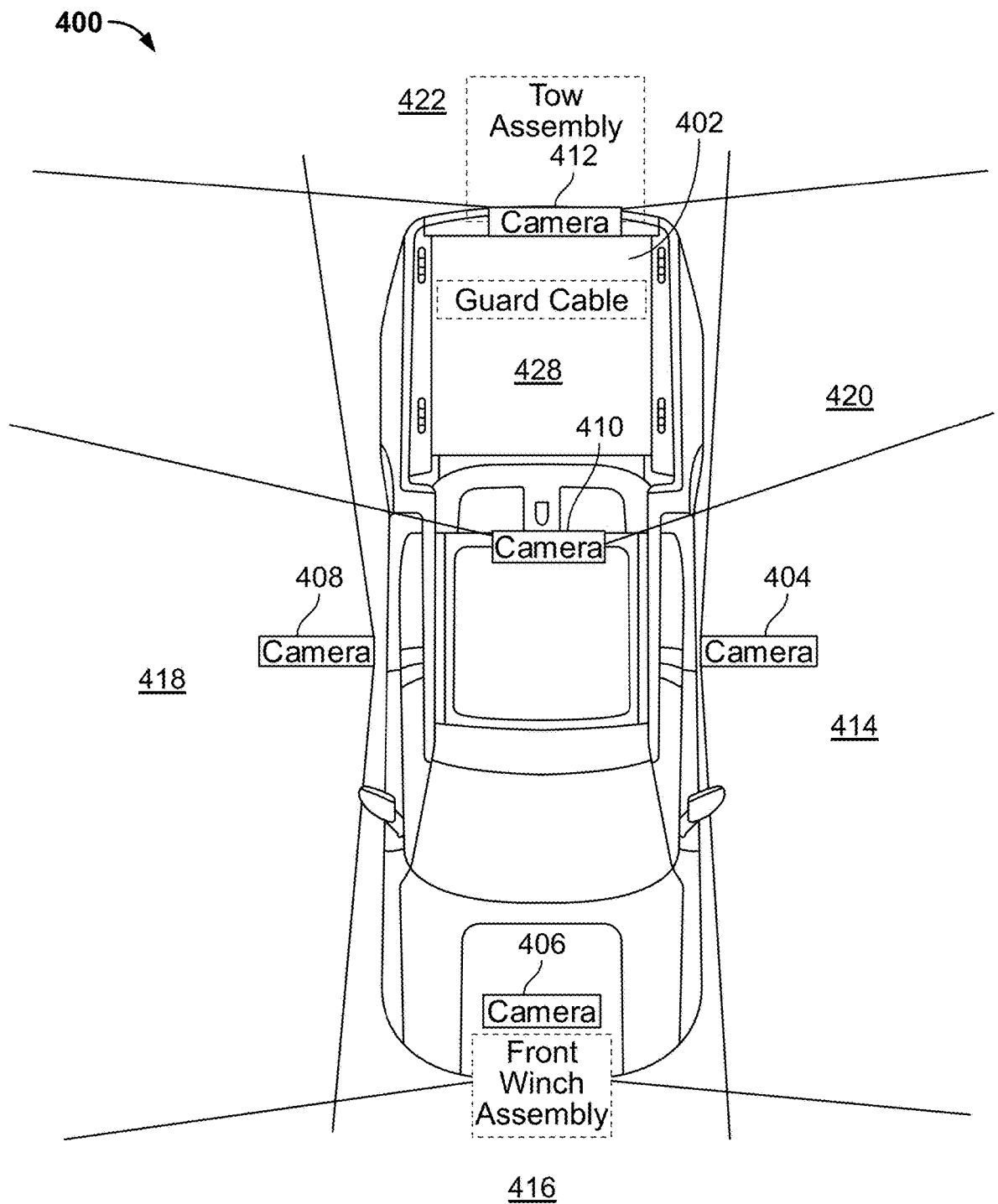
FIG. 4 shows a top view of an illustrative vehicle configured with a plurality of cameras disposed on the vehicle and their range of capture relative to a guard cable in a vehicle bay, in accordance with some embodiments of the present disclosure.

FIG. 4 shows top view 400 of an illustrative vehicle configured with a plurality of cameras disposed on the vehicle and their range of capture, in accordance with some embodiments of the present disclosure. Top view 400 may comprise more or fewer than the elements depicted in or described in reference to FIG. 4. Additionally, top view 400 may incorporate or may be incorporated into any or all of FIGS. 1-3 and 5-10.

Top view 400 includes a depiction of vehicle 402 along with the position of the cameras disposed around the vehicle. Vehicle 402 may include multiple cameras 404, 406, 408, 410 and 412, and a respective image range 414, 416, 418, 420 and 422 for each camera 404, 406, 408, 410 and 412. In some embodiments, one or more components (e.g., motion event detection network 210 and status detection module 218) of system 200 may be implemented by at least one of processing circuitry 102 or processing circuitry of server 136. One or more of the cameras 404, 406, 408, 410 and 412 may correspond to at least one of sensors 124, 126, 127, 128, 130, and 137 of FIG. 1 or cameras 304, 306, 308, 310 and 312 of FIG. 3. One or more of the cameras 404, 406, 408, 410 and 412 may be similarly positioned as described above in FIG. 3. In some embodiments, any suitable number of cameras may be used, and diverse positions of the cameras (e.g., showing a variety of different angles at varying distances from each other in various different environments) may be used.

The use of the cameras 404, 406, 408, 410 and 412, and their respective captured images, can be used to for at least one of determining or reporting at least one of a vehicle bay status or guard cable status. For example, by having the cameras capture images surrounding the vehicle, objects that appear within an image range may trigger capturing an image. In some embodiments, capturing an image includes capturing a video and audio. For example, a first image range 414 corresponds to an image captured by camera 404, a second image range 416 corresponds to an image captured by camera 406 (e.g., corresponding to the front winch assembly), a third image range 418 corresponds to an image captured by camera 408, a fourth image range 420 corresponds to an image captured by camera 410 (e.g., at least one of vehicle bay 428, the guard cable affixed to vehicle bay 428, or the tow assembly) and a fifth image range 422 corresponds to an image captured by camera 412 (e.g., corresponding to the tow assembly). The captured images may be captured in response to one or more motion-based events being detected by cameras 404, 406, 408, 410 and 412 or where an object is detected within any one of event detection thresholds 320, 322, 324, 326 by cameras 304, 306, 308, 310 and 312 or any other sensors, e.g., ultrasonic sensors, radars.

In some embodiments, vehicle 402 comprises at least one of a tow assembly or a front winch assembly. For example, either or each of the tow assembly and the front winch assembly comprise components which can be monitored like the guard cable (e.g., reflective materials which can be analyzed for position and motion characteristics through sensor data, video data, and or image data analysis).

Figure 5:
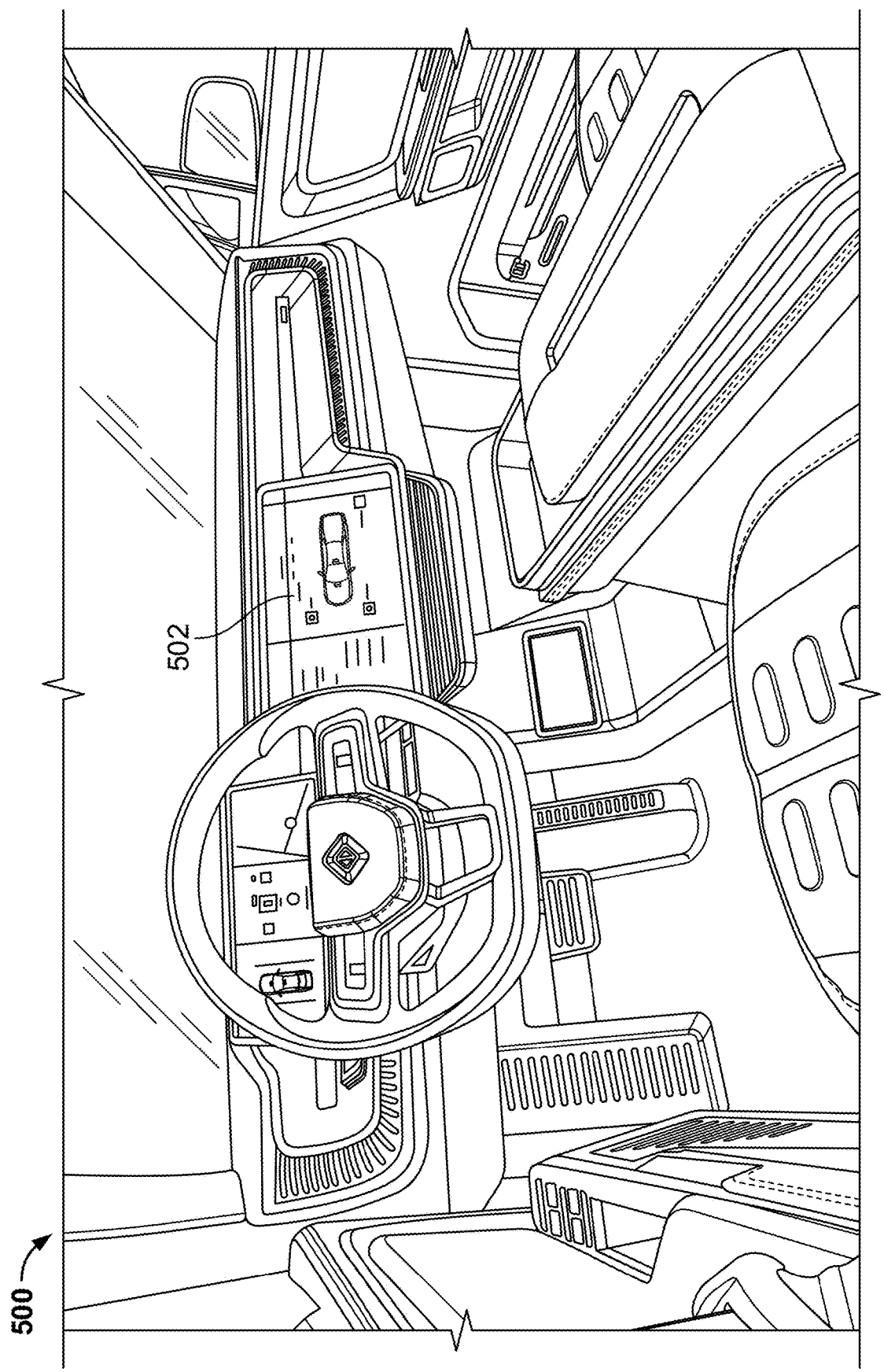
FIG. 5 depicts an illustrative example of a vehicle featuring a graphical user interface, in accordance with some embodiments of the present disclosure.

FIG. 5 depicts an illustrative example of vehicle 500 featuring a graphical user interface 502, in accordance with some embodiments of the present disclosure. Vehicle 500 may comprise more or fewer than the elements depicted in or described in reference to FIG. 5. Additionally, vehicle 500 may incorporate or may be incorporated into any or all of FIGS. 1-4 and 6-10. In some embodiments, a graphical user interface 502 may refer to components incorporated into, coupled to, or accessible by a vehicle such as a vehicle 500 in FIG. 5.

Vehicle 500 is equipped with a graphical user interface 502 that may be used to enable/disable vehicle systems including options to enable and disable monitor mode, vehicle event detection mode or any other mode, or no mode at all. For example, a user in vehicle 500 may use the graphical user interface 502 to access options on the vehicle 500. In some embodiments, the graphical user interface 502 may be incorporated into vehicle 500 or user equipment used to access such vehicle system while using vehicle 500. In some embodiments, vehicle systems displayed on the graphical user interface 502 may be communicatively connected with user inputs (e.g., microphone and speakers for providing voice command) of vehicle 500. For example, the user may provide a voice command to activate the monitor mode and the audio system incorporated into vehicle 500 may convert such a command to engage the vehicle monitor mode.

Figure 6:
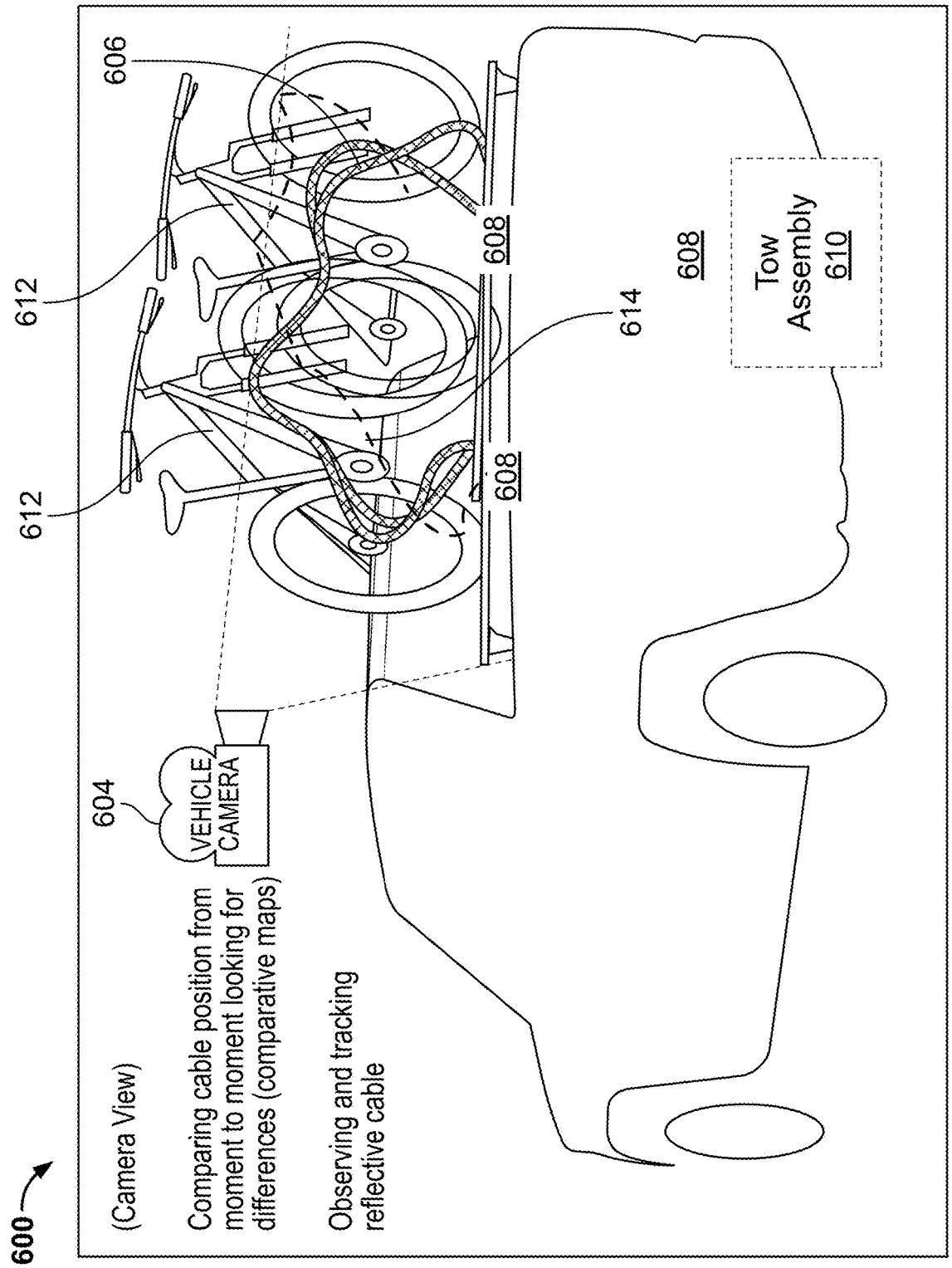
FIG. 6 depicts an illustrative example of a vehicle featuring a system configured to monitor and report a guard cable status and a vehicle bay status, in accordance with some embodiments of the present disclosure.

FIG. 6 shows a rear view of monitoring system 600. Monitoring system 600 comprises vehicle 602, vehicle camera 604, guard cable 606, vehicle sensors 608, and tow assembly 610. Monitoring system 600 may comprise more or fewer than the elements depicted in or described in reference to FIG. 6. Additionally, monitoring system 600 may incorporate or may be incorporated into any or all of FIGS. 1-5 and 7-10.

Arranged within a rear vehicle bay (e.g., a truck bed) corresponding to vehicle 602 is cargo 612. Cargo 612 is at least partially secured to the bay of vehicle 602 by guard cable 606. Unsecured guard cable 614 corresponds to an exemplary scenario of guard cable 606 losing at least one connection. Unsecured guard cable may be detected by any or all of camera 604 and vehicle sensors 608 (e.g., any or all of the sensors from FIGS. 1, 3, and 4). When guard cable 606 changes to unsecured guard cable 614, a motion event is detected based on at least one of camera or sensor data which may trigger a notification to be presented to the driver of vehicle 602 (e.g., as exemplified by any or all of the examples depicted in FIGS. 1-5 and described herein). In some embodiments, the camera is positioned at the upper rear of an occupant compartment of the vehicle and has a view of a bed storage area of the vehicle. The action performed in response to detecting the depicted motion event by the vehicle comprises generating a notification for a user or performing a security response (e.g., closing a cargo/storage area cover). In some embodiments not depicted in FIG. 6, a cable is a tow cable coupled to the vehicle. The processing circuitry of the vehicle is configured to identify the motion event by identifying slack in the tow cable. The action performed by the vehicle comprises adjusting speed of the vehicle in order to reduce slack in the tow cable.

Figure 7:
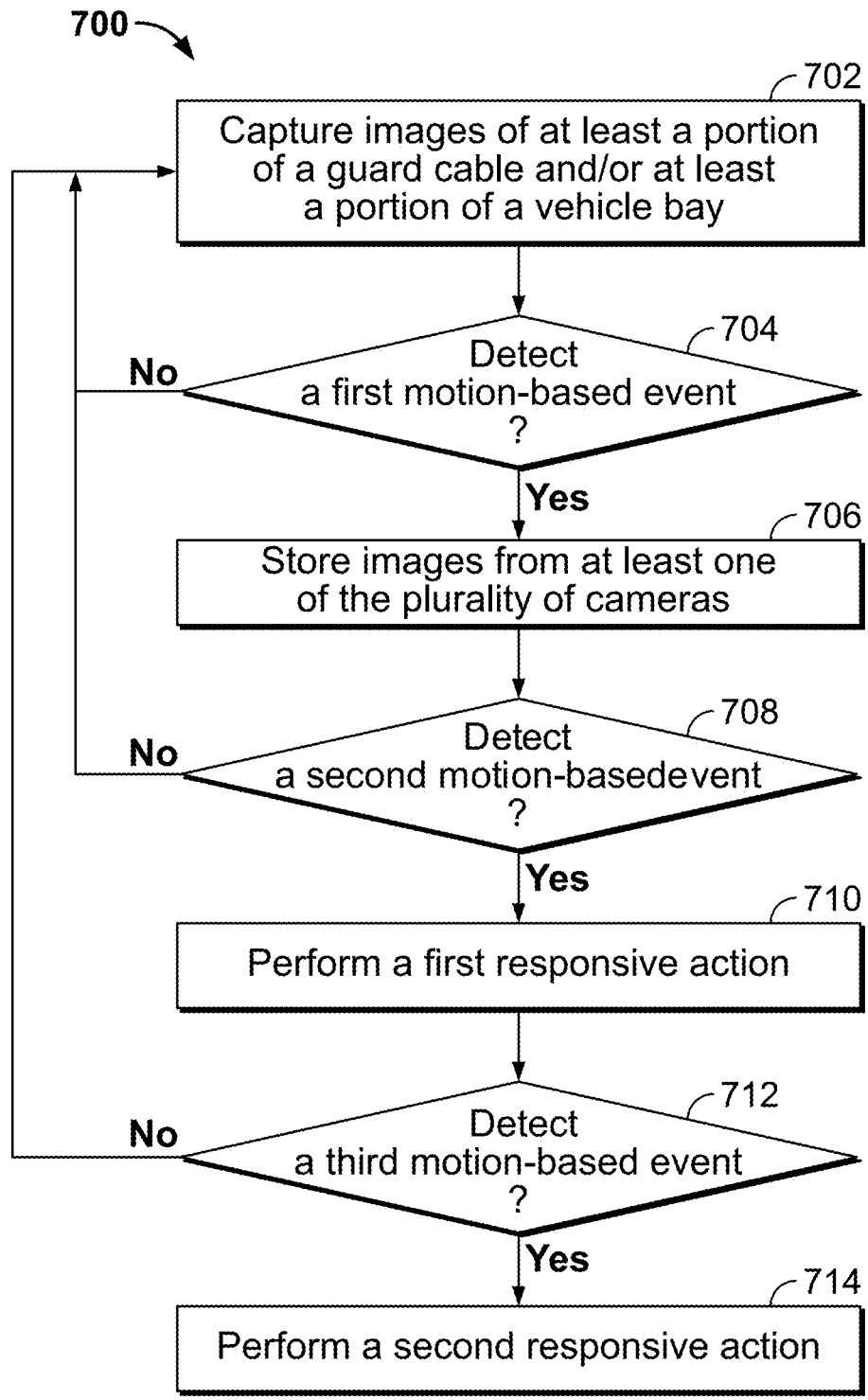
FIG. 7 shows a flowchart of an illustrative process for performing an action in response to detecting a motion event corresponding to at least one of a vehicle bay or a guard cable, in accordance with some embodiments of the present disclosure.

FIG. 7 shows a flowchart of process 700 for performing a response, in accordance with some embodiments of the present disclosure. Process 700 may comprise more or fewer than the elements depicted in or described in reference to FIG. 7. Additionally, process 700 may incorporate or may be incorporated into any or all of FIGS. 1-6, and 8-10. For example, process 700 may be executed at least in part by one or more of processing circuitry 102 or processing circuitry of server 136.

At 702, processing circuitry 102 may capture images of one or more of at least a portion of a guard cable or at least a portion of a vehicle bay, or more than a portion of at least one of the guard cable or the vehicle bay (e.g., captured by cameras 204, 206, 208, which may be wide-angle fisheye cameras as part of monitoring the vehicle to determine at least one of a vehicle bay, tow assembly, winch assembly, or guard cable status). In some embodiments, processing circuitry 102 captures the images whether the vehicle is in motion or stationery. In some embodiments, the captured images may be in response to a user enabling a monitor mode which monitors the surrounding area of the vehicle and the various vehicle components to detect motion events corresponding to at least a portion of at least one of a vehicle bay, a guard cable, a tow assembly, or a winch assembly that exceed an event threshold value (e.g., oscillation of a component, amount of movement of a component, rate of movement of a component, rate of acceleration of a component, frequency of a sound generated by a component). In some embodiments, the processing circuitry may employ the neural network 214 to provide an annotation appended thereto, or otherwise input to information metadata, where the annotation indicates at least one of a particular class (e.g., gear guard cable, person, car, bus, motorcycle, train, or bicycle) or a vehicle to object distance annotation. In some embodiments, at least one of images or video of at least one of a vehicle tow assembly or winch assembly may also be captured.

At 704, processing circuitry 102 may detect a first motion-based event surrounding an environment around vehicle 101 (e.g., as captured by cameras 204, 206, 208, which may be wide-angle fisheye cameras that may detect motion within a first event detection threshold 324). In some embodiments, the vehicle may be in a sleep mode with only ultrasonic sensors monitoring of at least a portion of at least one of the vehicle bay, the guard cable, the tow assembly, or the winch assembly 101 and in response to detecting a first motion-based event, the system may wake up the vehicle and initiate camera-based monitoring for at least one of motion events, collisions, or impacts. Any suitable number of images may be captured at any suitable capture rate. In some embodiments, the system may identify false positives by applying a time limit on the length of time the motion event is within a first event detection threshold. For example, someone walking by the front of the vehicle may not be a motion event if they are in the frame for less than a couple of seconds.

The first motion-based event may be detected based on a number of circumstances and scenarios. A first example of a motion-based event is where a vehicle is parked and inputs from the environment (e.g., a person, another vehicle, or another object) either impacts or interacts with at least one of the vehicle, the gear guard cable, the cargo secured by the gear guard cable, or the vehicle bay in which the cargo is secured via the gear guard cable. A second example of a motion-based event is where the vehicle is in motion and an environmental event occurs leading to a rapid change in at least one of rotation, lateral, or other acceleration of the vehicle which leads to a shift in a position of at least one of the gear guard cable, the cargo secured by the gear guard cable, or the vehicle bay in which the cargo is secured. The second example corresponds to a driver of the vehicle seeing an approaching object and having to perform a rapid change in trajectory (e.g., a hard turn) or where an approaching object impacts the vehicle while the vehicle is moving. In either the first or second example, once the motion-based event has occurred, there is a risk there was a shift or change in the status of the gear guard cable or the cargo which may require attention of the vehicle driver, thereby triggering the presentation of a status to inform the driver whether action should be taken with respect to the vehicle bay, the cargo in the vehicle bay, or the gear guard cable.

If processing circuitry detects a first motion-based event, ("Yes" at step 704), the processing circuitry proceeds to step 706. Otherwise, if the detected at least one image or video does not identify a first motion-based event, the detection falsely identifies at least one object or the at least one object in the image or video is beyond a range of interest (e.g., 10 feet) from vehicle 101, at least one of the image or video may be discarded and process returns to step 702. In some embodiments, the processing circuitry stores the images and permits them be overwritten if not accessed and saved.

At 706, processing circuitry 102 may store images from the first motion-based event of an environment around vehicle 101, e.g., captured by one or more cameras 204, 206, 208, which may be wide-angle fisheye cameras or a combination or fisheye and standard cameras. In some embodiments, object-to-vehicle distance may be determined using the training data of neural network 214 or a portion thereof, e.g., indicating annotations of distances between objects and a subject vehicle. In some embodiments, object-to-vehicle distance estimation may be trained based on using the use of at least one of ultrasonic sensors or training images in which an object is within 10 feet from a vehicle (e.g., manually tagged to indicate a distance from the object to the vehicle).

At 708, cameras 204, 206, 208 may detect a second motion-based event surrounding an environment around vehicle 101, e.g., captured by cameras 204, 206, 208, which may be wide-angle fisheye cameras within a second event detection threshold 322. The second motion-based event may be in response to the first motion-based event or may be a separate event where an object is detected within the second event detection threshold. In such a case, detecting an object within the second event detection threshold also satisfies detecting an object with in a first event detection threshold. Any suitable number of images may be captured at any suitable capture rate. If processing circuitry detects a second motion-based event, ("Yes" at step 708), the processing circuitry proceeds to step 710. Otherwise, if the detected at least one image or video does not identify a second motion-based event, the detection falsely identifies at least one object or the detected at least one object is beyond a range of interest (e.g., 8 feet) from vehicle 101, at least one of the at least one image or video may be discarded, and process returns to step 702. At 710, processing circuitry 102 may perform a first response action. For example, the processing circuitry 102 may use one or more audible alerts, visual alerts, closing windows, locking a door or covering the vehicle bay. The system may perform the first response action to deter the motion event from resulting in lost or damaged cargo in the bay.

At 712, processing circuitry 102 may detect a third motion-based event surrounding an environment around vehicle 101, e.g., captured by cameras 204, 206, 208, which may be wide-angle fisheye cameras within a third event detection threshold 320. If processing circuitry detects a third motion-based event, ("Yes" at step 708), the processing circuitry proceeds to step 714. Otherwise, if the detected at least one image or at least one video does not identify a third motion-based event, the detection falsely identifies at least one object, or the detected at least one object is beyond a range of interest (e.g., 4 feet) from vehicle 101, at least one of the at least one image or video may be discarded, and process returns to step 702. The second response action may be one or more of a visual alert, an audible alert, closing a window, locking a door, or closing the vehicle bay. In some embodiments, the second response action may close a motorized cable assembly on the vehicle bay. In some embodiments, the closed motorized cable assembly is over a truck bed. In some embodiments, the truck bed includes a number of thresholds triggers that each correspond to event detection thresholds based on proximity of a motion event to a truck bed. For example, a first event detection threshold for an object approaching the perimeter of a vehicle may cause an alarm to flash or a horn to sound, and another event detection threshold for an object/motion event accessing a storage area—e.g., an arm is detected reaching into the truck bed, may cause the motorized cable assembly to close. In such a case, the motorized cable assembly may begin to close along an alarm to alert the motion event. In some embodiment, closing the motorized cable assembly may begin in response to the object or motion event approaching the first event detection threshold.

In some embodiments, based on the output of status detection module 218, processing circuitry 102 may determine whether motion event analysis 216 is an outlier. For example, processing circuitry 102 may determine whether the object is located at a portion of at least one image or video (e.g., a sky) where an object of that particular class (e.g., a person) is determined to be at least one of unlikely to be detected or beyond a range of interest (e.g., 10 feet) from vehicle 101. If the output indicates motion event analysis 216 is at least one of a falsely identified object or is beyond a range of interest (e.g., 10 feet) from vehicle 101, at least one of the at least one video or image may be discarded.

Figure 8:
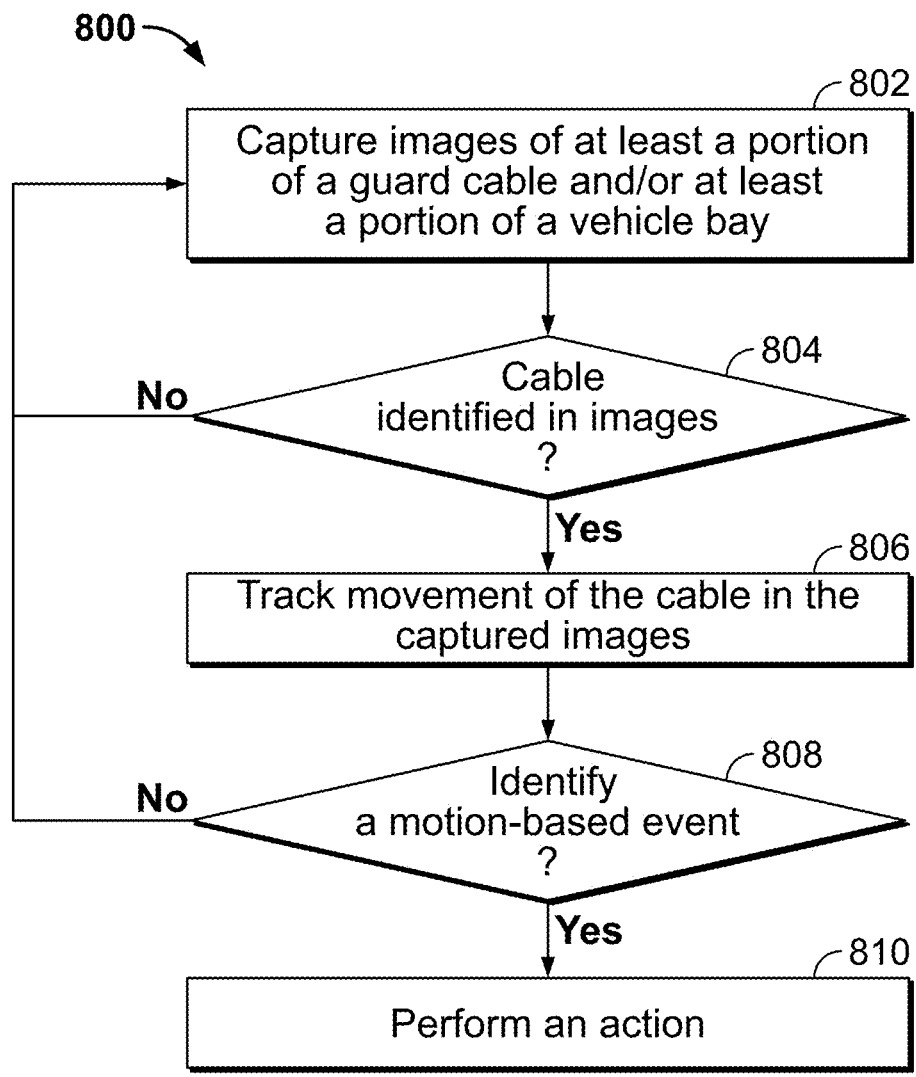
FIG. 8 shows a flowchart of an illustrative process for performing an action in response to detecting a motion event corresponding to at least one of a vehicle bay or a guard cable, in accordance with some embodiments of the present disclosure.

FIG. 8 shows a flowchart of process 800 for performing a response, in accordance with some embodiments of the present disclosure. Process 800 may comprise more or fewer than the elements depicted in or described in reference to FIG. 8. Additionally, process 800 may incorporate or may be incorporated into any or all of FIGS. 1-7, 9, and 10. For example, process 800 may be executed at least in part by one or more of processing circuitry 102 or processing circuitry of server 136.

At 802, images are captured of at least a portion of a guard cable or at least a portion of a vehicle bay, or both. If, at 804, the cable is not identified in the images (NO at 804), then process 800 returns to process block 802. If, at 804, the cable is identified in the captured images (YES at 804), then process 800 proceeds to process block 806. For example, the cable may be identified based on the detection of a reflective coating, tape, pattern, paint, or other reflective material which may be identifiable in captured images. At 806, movement of the cable in the captured images is tracked. For example, the images are analyzed for identifiers (e.g., reflective material) which can be used to characterize aspects of the cable motion in the images as compared to expected motion. A neural network corresponding to a vehicle configured to execute the processes of the present disclosure may be configured to store images and bin images based on the detection of the cable and based on the identification of motion events. In some embodiments, the neural network may bin images based on expected cable behavior known or past identified motion-events. Each bin of images may be iteratively updated using new data collected to improve the warnings and notifications generated by the system. If, at 808, a motion-based event is not identified (NO at 808), then process 800 returns to process block 802. If, at 808, a motion-based event is identified (YES at 808), then the vehicle is caused to perform an action at 810. For example, the motion-based event may involve at least one of the gear guard cable, the cargo secured by the cable, or the vehicle bay in which the cargo is secured. Any or all of these elements may move or be damaged. The action performed at 810 may include generating a status notification for any or all elements listed or performing a securing move such as closing or locking the vehicle bay (e.g., closing a tonneau cover to prevent losing the cargo) or causing the vehicle to slow based on damage.

Figure 9:
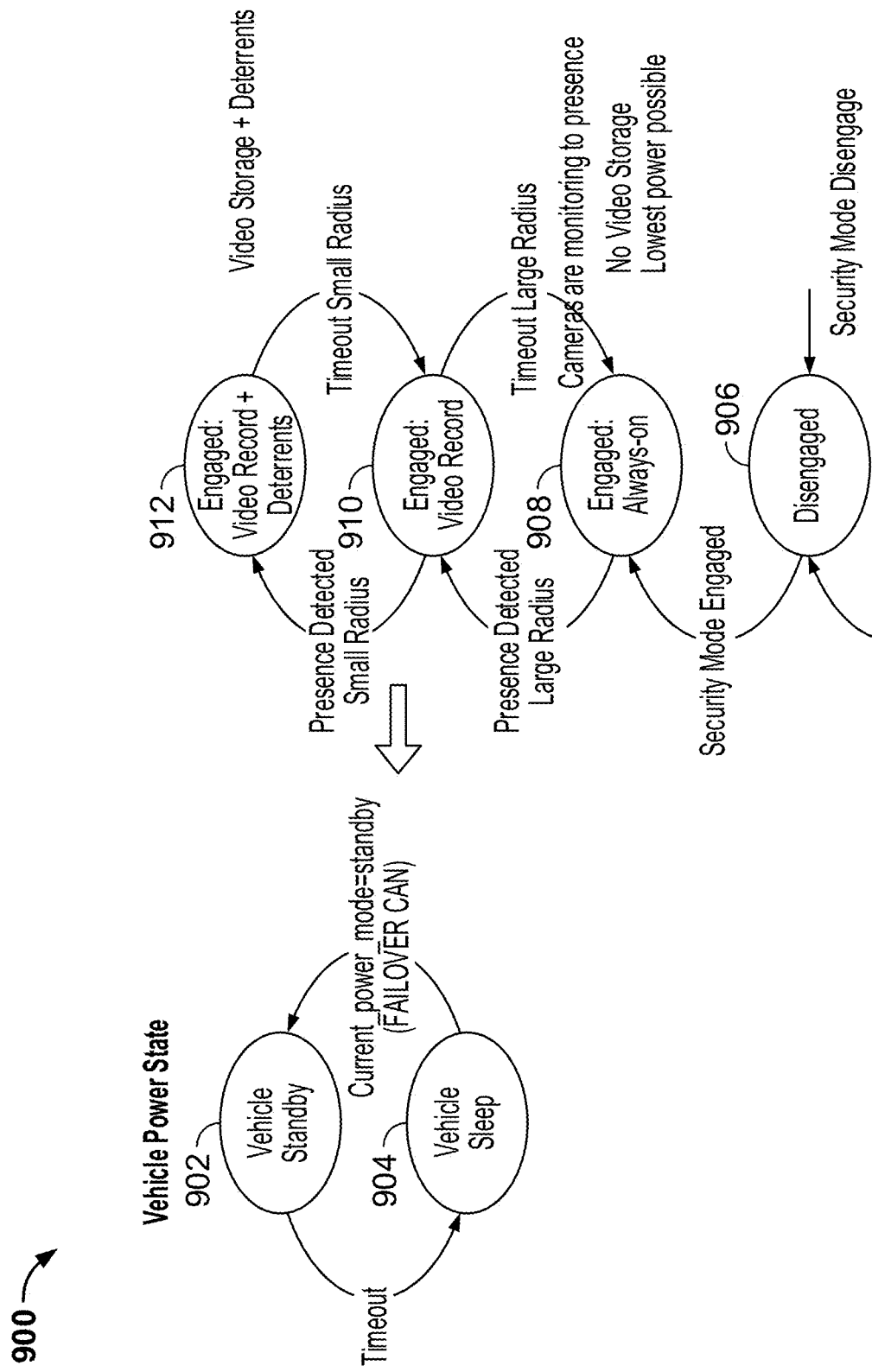
FIG. 9 shows a flowchart of an illustrative process for optimizing the power supply while operating in monitoring mode, in accordance with some embodiments of the present disclosure.

FIG. 9 shows a flowchart of process 900 for optimizing the power supply while operating in a monitor mode, in accordance with some embodiments of the present disclosure. Process 900 may comprise more or fewer than the elements depicted in or described in reference to FIG. 9. Additionally, process 900 may incorporate or may be incorporated into any or all of FIGS. 1-8 and 10. Processing circuitry 102 may monitor the vehicle power state to monitor the environment and vehicle bay of vehicle 101. For example, when the battery level is low, the system may be disengaged to avoid draining the battery power.

At 904, the system starts at a vehicle sleep mode. For example, when there are no motion events and no impending collisions. In this mode, the vehicle preserves battery power. At 902, in response to a motion event approaching the vehicle or an impending collision is identified, the system switches to the vehicle standby mode. In the standby mode, the vehicle may issue event detections, for example, first response action and second response action discussed above in more detail. The monitor mode starts in a disengaged mode at 906, and in response to a request or automatically based on locking the vehicle, the vehicle monitor mode is engaged to step 908. In 908, the monitor mode is engaged and monitoring the surrounding environment. When the presence of an object, such as a motion event, is detected within a first event detection threshold 324 (e.g., large radius), then at 910, the system begins to record the vehicle's surrounding environment and at least a portion of at least one of a vehicle bay, a guard cable, a tow assembly, or a winch assembly. If the presence of the object ceases, then the monitor mode reverts to monitoring the vehicle's surrounding environment and at least a portion of at least one of a vehicle bay, a guard cable, a tow assembly, or a winch assembly. Continuing to 912, when the presence of a motion event, is detected within a second event detection threshold 322 (e.g., small radius such as four feet), then at 912, the system begins to record the vehicle's surrounding environment and play audible and visual alerts, as discussed earlier. In the case that the presence of the motion event, is out of the first threshold, then the system returns to the previous step. In each of the previous steps, as the vehicle shifts from a disengaged status to an engaged status, the vehicle increases in power usage and when operating in battery conservation mode, the length that the vehicle remains at the higher power modes is reduced.

Figure 10:
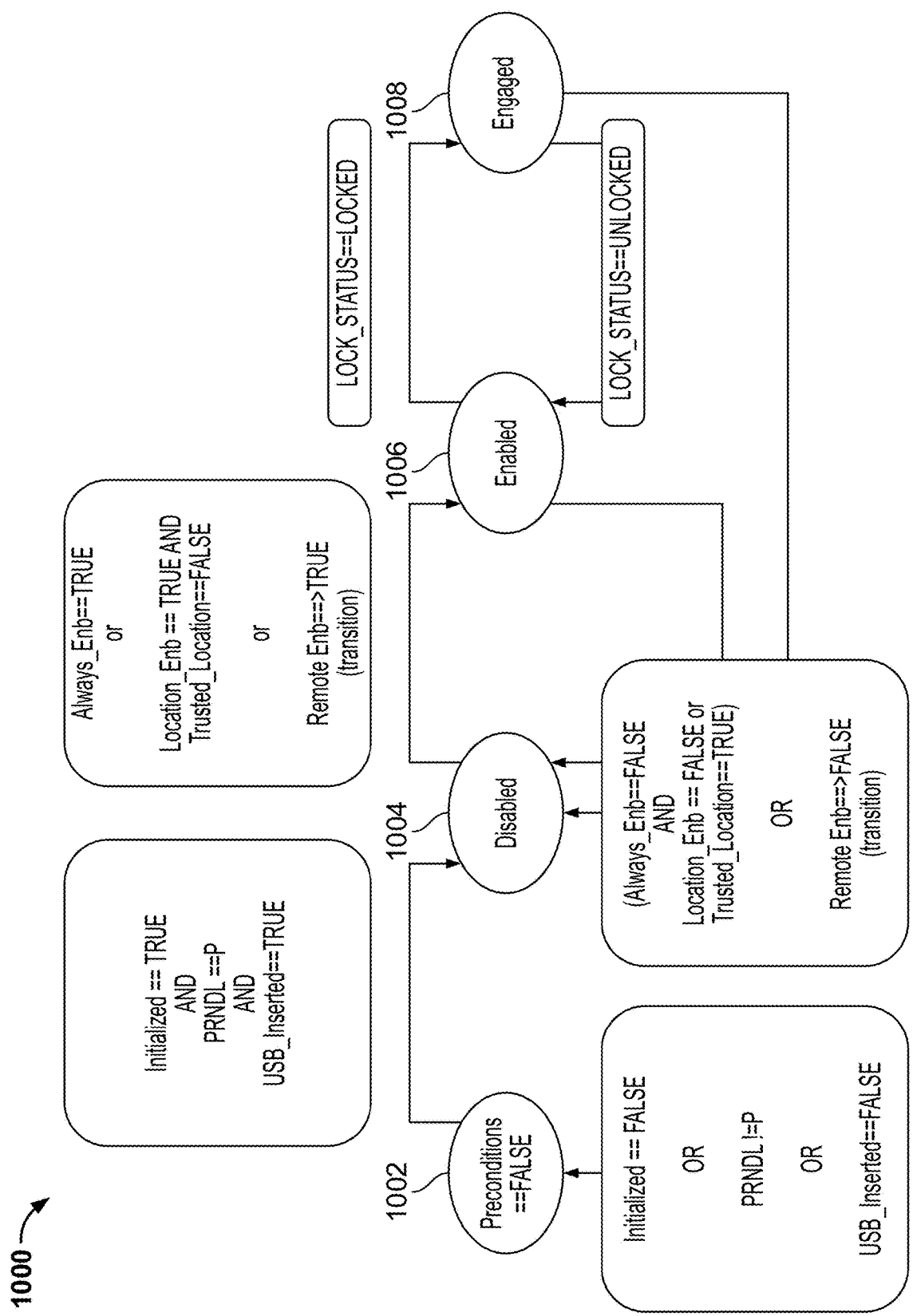
FIG. 10 shows a flowchart of an illustrative process for operating the vehicle in monitoring mode, in accordance with some embodiments of the present disclosure.

FIG. 10 shows a flowchart of process 1000 for operating the vehicle in a monitoring monitor mode, in accordance with some embodiments of the present disclosure. Process 1000 may comprise more or fewer than the elements depicted in or described in reference to FIG. 10. Additionally, frame 100 may incorporate or may be incorporated into any or all of FIGS. 1-9. The system depicted via FIG. 10 includes a four states of the monitor mode, from precondition state 1002, disabled state 1004, enabled state 1006 and engaged state 1008. In the precondition state 1002, the vehicle operator can set the conditions determining the motion-based events and the response action in response to a motion event. Further, the vehicle may include a storage device for capturing the video content. In the disabled state 1004, the vehicle operator has preprogrammed the monitor mode but is electively disabled the monitor mode or is missing at least one criteria (e.g., missing storage device). In the enabled state 1006, the vehicle is enabled in the monitor mode and is unlocked. In this mode, the vehicle does not record any content. In the engaged state 1008, the vehicle is locked and monitoring for motion events and ready to perform any and all response actions.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

While some portions of this disclosure may refer to examples, any such reference is merely to provide context to the instant disclosure and does not form any admission as to what constitutes the state of the art.

What is claimed is:

1. A system comprising:
   a camera mounted on a vehicle and configured to capture a plurality of images of a storage area of the vehicle, wherein the storage area is external to an occupant compartment of the vehicle; and processing circuitry configured to:
- identify at least an end of a cable in the storage area for securing cargo in the storage area in the plurality of captured images based on object detection features defining at least the end of the cable;
- characterize movement of the cable relative to the cargo based on the plurality of captured images;
- characterize a motion event of the cable based on cable movement patterns across the plurality of images as recognized by a machine learning model that accepts the plurality of images as an input, wherein the motion event corresponds to a cable status output by the machine learning model;
- receive the cable status from the machine learning model; and
- in response to receiving the cable status, cause the vehicle to adjust torque of a winch coupled to the cable in order to modify the cable status.

2. The system of claim 1, wherein the cable is one of a gear guard cable, a winch cable, or a tow cable.

3. The system of claim 1, wherein the cable comprises a reflective coating or reflective elements.

4. The system of claim 1, wherein the processing circuitry is configured to characterize the movement of the cable relative to the cargo based on the plurality of captured images is configured to characterize the movement based on identifying one or more of a reflective coating or a reflective element of the cable.

5. The system of claim 1, wherein:
- the camera is positioned at an upper rear external surface of the occupant compartment and has a view of a bed storage area of the vehicle; and
- the processing circuitry is further configured to generate a notification for a vehicle occupant indicating the vehicle is performing a security response to address the cable status.

6. The system of claim 5, wherein when the vehicle is moving, the processing circuitry is configured to generate the notification for the vehicle occupant indicating the cable or gear may be loose.

7. The system of claim 5, wherein when the vehicle is at rest, the processing circuitry is further configured to generate at least one computer readable instruction for transmission throughout a network of the vehicle, wherein the at least one computer readable instruction comprises the security response.

8. The system of claim 1, wherein the processing circuitry is configured to cause one or more vehicle components to perform a security response based on transmission of computer readable instructions, wherein the security response comprises activating one or more of a visual alert or an audible alert.

9. The system of claim 1, wherein:
- the cable is a winch cable coupled to the winch; and
- the processing circuitry is configured to identify the motion event based on the movement by identifying slack in the winch cable.

10. The system of claim 1, wherein:
- the cable is a tow cable coupled to the vehicle;
- the processing circuitry is configured to identify the motion event based on the movement by identifying slack in the tow cable; and the processing circuitry is further configured to transmit computer readable instructions that cause adjustment of a speed of the vehicle to address the slack in the tow cable.

11. A method comprising:
- capturing a plurality of images of a storage area of a vehicle using a camera mounted on the vehicle, wherein the storage area is external to an occupant compartment of the vehicle;
- identifying, using processing circuitry, at least an end a cable in the storage area for securing cargo in the storage area in the plurality of captured images based on object detection features defining at least the end of the cable;
- characterizing, using the processing circuitry, movement of the cable relative to the cargo based on the plurality of captured images;
- characterizing, using the processing circuitry, a motion event of the cable in the plurality of captured images based on cable movement patterns across the plurality of images as recognized by a machine learning model that accepts the plurality of images as an input, wherein the motion event corresponds to a cable status output by the machine learning model;
- receiving, using the processing circuitry, the cable status from the machine learning model; and
- in response to receiving the cable status, causing the vehicle to adjust torque of a winch coupled to the cable in order to modify the cable status using the processing circuitry.

12. The method of claim 11, wherein the cable is one of a gear guard cable, a winch cable, or a tow cable.

13. The method of claim 11, wherein the cable comprises a reflective coating or reflective elements.

14. The method of claim 11, wherein characterizing the movement of the cable relative to the cargo based on the plurality of captured images comprises identifying one or more of a reflective coating or a reflective element of the cable.

15. The method of claim 11, wherein:
- the camera is positioned at an upper rear external surface of the occupant compartment and has a view of a bed storage area of the vehicle; and
- the method further comprises generating, using the processing circuitry, a notification for a vehicle occupant indicating that the vehicle is performing a security response to address the cable status.

16. The method of claim 15, wherein when the vehicle is moving, the processing circuitry generates the notification for the vehicle occupant indicating the cable or gear may be loose.

17. The method of claim 15, further comprising:
- generating, using the processing circuitry, at least one computer readable instruction for transmission throughout the vehicle when the vehicle is at rest, wherein the at least one computer readable instruction comprises the security response.

18. The method of claim 11, further comprising:
- generating, using the processing circuitry, computer readable instructions that, when processed, cause one or more vehicle components to perform a security response based on transmission of computer readable instructions, wherein the security response comprises activating one or more of a visual alert or an audible alert.

19. The method of claim 11, wherein:
the cable is a winch cable coupled to the winch; and
identifying the motion event comprises identifying slack in the winch cable.

20. The method of claim 11, wherein:
the cable is a tow cable coupled to the vehicle;
identifying the motion event comprises identifying, using the processing circuitry, slack in the tow cable; and
the method further comprises:
  transmitting computer readable instructions that cause adjustment of a speed of the vehicle to address the slack in the tow cable.

\* \* \* \* \*